United States Patent Office 2,969,399
Patented Jan. 24, 1961

2,969,399

O-ALKYLATION OF PHENOLIC COMPOUNDS

Louis Schmerling, Riverside, Ill., assignor, by mesne assignments, to Universal Oil Products Company, Des Plaines, Ill., a corporation of Delaware No Drawing. Filed Dec. 23, 1957, Ser. No. 704,347

10 Claims. (Cl. 260—613)

This invention relates to a process for the alkylation of aromatic compounds containing at least one hydroxy substituent. More particularly the invention relates to a process for the O-alkylation of aromatic compounds containing at least one hydroxy substituent by condensing said compound with a bicycloalkadiene.

It is an object of this invention to prepare alkylated aromatic compounds.

A further object of this invention is to provide a process for the O-alkylation of phenolic compounds by condensing aromatic compounds containing at least one hydroxy substituent with a bicycloalkadiene in the presence of a solid acidic catalyst.

One embodiment of the invention is found in a process for the alkylation of an aromatic compound containing at least one hydroxy substituent which comprises condensing said aromatic compound with a bicycloalkadiene in the presence of an acid-acting alumina catalyst at alkylating conditions, and recovering the resultant O-alkylated aromatic compound.

A further embodiment of the invention resides in a process for the O-alkylation of a hydroxy substituted aromatic compound which comprises condensing said compound with norbornadiene in the presence of a catalyst comprising silica-alumina at alkylation conditions, and recovering the resultant O-alkylated aromatic compound.

A specific embodiment of the invention is found in a process for the alkylation of phenol which comprises condensing phenol with norbornadiene in the presence of a catalyst comprising silica-alumina at a temperature in the range of from about 25° to about 250° C., and recovering the resultant 3-phenoxynortricyclene.

Other objects and embodiments referring to alternative catalysts, alternative hydroxy substituted aromatic compounds and alternative bicycloalkadienes will be found in the following further detailed description of the invention.

It has now been discovered that an aromatic compound containing at least one hydroxy substituent can be condensed with a bicycloalkadiene to form an O-alkylated aromatic compound by condensing said reactants in the presence of certain solid acidic catalysts. It has further been found that the desired reaction will not proceed in the presence of active alkylation catalysts which have been used successfully in the alkylation of phenols with other olefinic compounds, for example, sulfuric acid dissolved in acetic acid. When phenol and norbornadiene are condensed in the presence of these active catalysts the resultant product is not the desired ether, but rather a totally unexpected product. One example of this is the reaction of phenol with norbornadiene in the presence of sulfuric acid which is dissolved in acetic acid, the reaction being carried out at relatively low temperatures, i.e., 3°–30° C., the chief reaction being the addition of the acetic acid to the norbornadiene to yield 3-nortricyclyl acetate. It can therefore be concluded that strongly acidic catalysts are too active for the formation of the desired product, the formation of ethers or O-alkylated aromatic compounds being dependent upon the use of catalysts hereinafter named.

The reaction products formed by the alkylation of aromatic compounds containing at least one hydroxy substituent find a wide variety of uses in the chemical field. For example, the alkylated aromatic compound may be treated with sulfonic acid to form a sulfonated derivative which may be used as a wetting agent. In addition the ether may undergo other reactions (for example, nitration followed by reduction) to form amino compounds which may be useful as additives for gasoline.

Suitable aromatic compounds containing at least one hydroxy substituent include both mono- and polyhydric phenols such as phenol, hydroquinone, resorcinal, catechol, phloroglucinol, o-cresol, m-cresol, p-cresol, o-ethylphenol, m-ethylphenol, p-ethylphenol, the isomeric propyl, butyl, pentyl, hexyl, heptyl, octyl, nonyl, decyl, undecylphenols, etc.; cycloalkylphenols such as p-cyclohexylphenol; alkyl and cycloalkyl ethers of the polyhydric phenols in which the compound contains at least one free hydroxy group such as o-methoxyphenol, m-methoxyphenol, p-methoxyphenol, o-ethoxyphenol, m-ethoxyphenol, p-ethoxyphenol, o-propoxyphenol, m-propoxyphenol, p-propoxyphenol, o-butoxyphenol, m-butoxyphenol, p-butoxyphenol, 2,6-dimethoxyphenol, 2,3-dimethoxyphenol, 2,4-dimethoxyphenol, 2,3-diethoxyphenol, 2,4-diethoxyphenol, 2,6-diethoxyphenol, o-cyclopentoxyphenol, m-cyclopentoxyphenol, p-cyclopentoxyphenol, o-cyclohexoxyphenol, m-cyclohexoxyphenol, p-cyclohexoxyphenol, o-cycloheptoxyphenol, m-cycloheptoxyphenol, p-cycloheptoxyphenol, etc.; nuclear substituted derivatives of phenol such as o-chlorophenol, m-chlorophenol, p-chlorophenol, o-bromophenol, m-bromophenol, p-bromophenol, o-iodophenol, m-iodophenol, p-iodophenol, o-nitrophenol, m-nitrophenol, p-nitrophenol, etc. In addition it is also contemplated within the scope of this invention that polynuclear aromatic compounds containing at least one hydroxy substituent may also be O-alkylated to form the desired products, such compounds including 1-hydroxynaphthalene,
2-hydroxynaphthalene,
1-hydroxyanthracene,
2-hydroxyanthracene,
1-hydroxychrysene,
2-hydroxychrysene,
3-hydroxychryesne,
1-hydroxypyrene,
2-hydroxypyrene,
1,2-dihydroxynaphthalene,
1,4-dihydroxynaphthalene,
1,2-dihydroxyanthracene,
1,2-dihydroxychrysene,
1,2-dihydroxypyrene,
1-hydroxy-2-methoxynaphthalene,
1-hydroxy-2-ethoxynaphthalene,
1-hydroxy-2-methoxyanthracene,
1-hydroxy-2-methoxychrysene,
1-hydroxy-2-methoxypyrene,
1-hydroxy-2-chloronaphthalene,
1-hydroxy-4-chloronaphthalene,
1-hydroxy-2-chloroanthracene,
1-hydroxy-2-chlorochrysene, etc.

Suitable alkylating agents comprise bicycloalkadienes such as bicyclo-(2.2.1)-2,5-heptadiene (norbornadiene),
bicyclo-(2.2.2)-2,5-octadiene,
1-methylnorbornadiene,
1-ethylnorbornadiene,
2-methylnorbornadiene,
2-ethylnorbornadiene,
1,2-dimethylnorbornadiene, 1,2-diethylnorbornadiene,
2,3-dimethylnorbornadiene,
2,3-diethylnorbornadiene,
2,6-dimethylnorbornadiene,
2,6-diethylnorbornadiene,
2,3,5-trimethylnorbornadiene,
1-methylbicyclo-(2.2.2)-2,5-octadiene,
1-ethylbicyclo-(2.2.2)-2,5-octadiene,
2-methylbicyclo-(2.2.2)-2,5-octadiene,
2-ethylbicyclo-(2.2.2)-2,5-octadiene,
1,2-dimethylbicyclo-(2.2.2)-2,5-octadiene,
1,-2-diethylbicyclo-(2.2.2)-2,5-octadiene,
2,3-dimethylbicyclo-(2.2.2)-2,5-octadiene,
2,3-diethylbicyclo-(2.2.2)-2,5-octadiene,
2,6-dimethylbicyclo-(2.2.2)-2,5-octadiene,
2,6-diethylbicyclo-(2.2.2)-2,5-octadiene,
2,3,5-trimethylbicyclo-(2.2.2)-2,5-octadiene, etc.

It is to be understood that the above mentioned mono- and polynuclear aromatic compounds containing at least one hydroxy substituent, as well as the hereinbefore mentioned bicycloalkadienes are only representatives of the class of compounds which may be used, and that the present inventoin is not necessarily limited thereto.

Catalysts which may be used to effect the condensation between the aromatic hydrocarbon containing at least one hydroxy substituent and the bicycloalkadiene comprise acidic alumina catalysts such as silica-alumina, alumina treated with hydrogen fluoride, alumina treated with hydrogen chloride, etc. The condenstion or alkylation will be carried out at temperatures in the range from about 25° to about 250° C. or more, preferably at from about 50° to about 150° C., and at pressures ranging from atmospheric to 100 atmospheres or more. When the reaction is effected at temperatures in the lower portion of the hereinbefore mentioned temperature range atmospheric pressure will usually be employed. However, if the reaction is effected at temperatures in the higher portion of the range superatmospheric pressures ranging from 2 to about 100 atmospheres or more will be employed, the pressure being sufficient to maintain a portion of the reactants in the liquid phase.

The process of this invention may be effected in any suitable manner and may comprise either a batch or a continuous type operation. When a batch type operation is used, a quantity of the aromatic compound containing at least one hydroxy substituent, the bicycloalkadiene and the catalyst is placed in an appropriate apparatus such as, for example, a rotating or stirred autoclave or an alkylation flask. The apparatus is then heated to the desired temperature and maintained thereat for a predetermined residence time at the end of which time the flask and contents thereof are cooled to room temperature and the desired reaction product is recovered by conventional means such as, for example, by washing, drying, fractional distillation, crystallization, etc.

Another method by which the process of this invention may be effected is a continuous type operation. One particular method is the fixed bed operation in which the aromatic compound containing at least one hydroxy substituent and the bicycloalkadiene are continuously charged to a reaction zone containing a fixed bed of the desired catalyst, said zone being maintained at the proper operating conditions of temperature and pressure. The reaction zone may comprise an unpacked vessel or coil or may be lined with an adsorbent packing material such as dehydrated bauxite, alumina, fire brick, and the like. The two reactants may be charged through separate lines or, if so desired, may be admixed prior to entry into said reaction zone and charged thereto in a single stream. Upon completion of the desired residence time the reaction products are continuously withdrawn, separated from the reactor effluent, purified by conventional means hereinbefore set forth and recovered, while the effluent may be separated and recharged to said reaction zone as a portion of the starting material. Another continuous type operation comprises the moving bed type in which the reactants and the catalyst bed move either concurrently or countercurrently to each other while passing through said reaction zone. Yet another continuous type of operation which may be used is the slurry type in which the catalyst is carried into the reaction zone as a slurry in one or the other of the reactants.

The following examples are given to illustrate the process of the present invention; they are not, however, intended to limit the generally broad scope of the present invention in strict accordance therewith.

*Example I*

Ninety-five grams of phenol along with 10 g. of a silica-alumina catalyst were placed in an alkylation flask and continuously stirred while 40 g. of norbornadiene was slowly added thereto. The flask was heated to a temperature of about 50° C. and maintained at a temperature in the range of from 50° to about 80° C. for a period of about 3 hours. At the end of this time the flask and contents thereof were cooled to room temperature, after which the clear, light amber liquid product layer was decanted from the dark red catalyst layer, taken up in ether and extracted with dilute sodium hydroxide. The portion that was insoluble in alkali was subjected to fractional distillation under reduced pressure after distilling off the ether. The cut boiling at 97° C. at 0.5 mm. pressure (275° C. at 760 mm. pressure) had a refractive index, $n_D^{20}$ of 1.5535. This cut which amounted to 44 g. (55% of the theoretical yield) was subjected to analysis with the following results:

Calc. for $C_{13}H_{14}O$: C, 83.77; H, 7.62. Found: C, 83.83; H, 7.58.

The cut consisted chiefly of 3-phenoxynortricyclene (i.e., phenyl 3-nortricyclyl ether).

*Example II*

A mixture of 62 g. of p-methoxyphenol and 10 g. of silica-alumina catalyst were placed in an alkylation flask. To this mixture was slowly added 20 g. of norbornadiene dissolved in 30 g. of benzene while continuously stirring the mixture. The flask was heated to a temperature of about 50° C. and maintained at a temperature between 50° C. and 66° C. for a period of 2 hours. At the end of this time the flask and contents thereof were cooled to room temperature and 100 g. of reaction product in the upper layer was decanted from the lower catalyst layer. The reaction product was taken up in ether and extracted with dilute sodium hydroxide. After distilling off the ether the residue, comprising the alkali-insoluble portion of the mixture, was subjected to fractional distillation under reduced pressure. The cut (20 g.; 42% of the theoretical yield) boiling at 111–112° C. at 0.5 mm. pressure (293–294° C. at 760 mm.) having a refractive index, $n_D^{20}$ of 1.5540, comprising 3-(p-methoxyphenoxy)nortricyclene was analyzed with the following results:

Calc. for $C_{14}H_{12}O_2$: C, 77.75; H, 7.46. Found: C, 78.01; H, 7.73.

*Example III*

To illustrate the point that sulfuric acid could not be used as a catalyst for the formation of O-alkylated derivatives of phenolic compounds from norbornadiene in a manner analogous to its use with aliphatic olefins another experiment was performed. A mixture of 62 g. of p-methoxyphenol, 124 g. of acetic acid and 5 g. of sulfuric acid were placed in an alkylating flask. A mixture of 20 g. of norbornadiene dissolved in 20 g. of acetic acid was slowly added to a stirred mixture of the phenol and the catalyst. The flask was cooled to a temperature of about 3° C. and maintained at a temperature of 3–30° C. for 2.5 hours. At the end of this time the product was poured into ice water, and the organic product was taken up in ether. The ether solution was then extracted with sodium hydroxide and the alkali-insoluble material subjected to fractional distillation under reduced pressure. This distillation yielded 9 g. (27% of the theoretical yield) of 3-nortricylyl acetate, B.P. 43–45° C. at 0.5 mm. and having a refractive index, $n_D^{20}$, of 1.4730. No material having a boiling point (111–112° C. at 0.5 mm.) or a refractive index approximating the refractive index (1.5540) of 3-(p-methoxyphenoxy)nortricyclene was obtained. The aqueous alkaline extract was acidified and the liberated oil was taken up in ether. The ether was distilled off, leaving an oil which crystallized on standing, the melting point of these crystals being 51–52° C. When the crystals were admixed with p-methoxyphenol and subjected to a melting point determination no depression of the melting point was noted. It was therefore apparent that it was not possible to obtain the desired O-alkylated product when using sulfuric acid as the catalyst.

I claim as my invention:

1. A process for the O-alkylation of an aromatic compound containing at least one hydroxy substituent which comprises condensing said aromatic compound with a bicycloalkadiene in the presence of an acid-acting alumina catalyst selected from the group consisting of silica-alumina, HF-treated alumina and HCl-treated alumina at alkylating conditions, and recovering the resultant alkylated aromatic compound.

2. A process for the O-alkylation of an aromatic compound containing at least one hydroxy substituent which comprises condensing said aromatic compound with a bicycloalkadiene in the presence of silica-alumina at alkylating conditions, and recovering the resultant O-alkylated aromatic compound.

3. A process for the O-alkylation of an aromatic compound containing at least one hydroxy substituent which comprises condensing said aromatic compound with a bicycloalkadiene in the presence of alumina treated with hydrogen fluoride at alkylating conditions, and recovering the resultant O-alkylated aromatic compound.

4. A process for the O-alkylation of an aromatic compound containing at least one hydroxy substituent which comprises condensing said aromatic compound with a bicycloalkadiene in the presence of alumina treated with hydrogen chloride at alkylating conditions, and recovering the resultant O-alkylated aromatic compound.

5. A process for the O-alkylation of an aromatic compound containing at least one hydroxy substituent which comprises condensing said aromatic compound with norbornadiene in the presence of silica-alumina at alkylating conditions, and recovering the resultant O-alkylated aromatic compound.

6. A process for the O-alkylation of phenol which comprises condensing said phenol with norbornadiene in the presence of silica-alumina at a temperature in the range of from about 50° to about 150° C., and recovering the resultant 3-phenoxynortricyclene.

7. A process for the O-alkylation of p-methoxyphenol which comprises condensing said p-methoxyphenol with norbornadiene in the presence of silica-alumina at a temperature in the range of from about 50° to about 150° C., and recovering the resultant 3-(p-methoxyphenoxy)-nortricyclene.

8. A process for the O-alkylation of m-cresol which comprises condensing said m-cresol with norbornadiene in the presence of silica-alumina at a temperature in the range of from about 50° to about 150° C., and recovering the resultant 3-(m-methylphenoxy)nortricyclene.

9. A process for the O-alkylation of p-chlorophenol which comprises condensing said p-chlorophenol with norbornadiene in the presence of silica-alumina at a temperature in the range of from about 50° to about 150° C., and recovering the resultant 3-(p-chlorophenoxy)-nortricyclene.

10. A process for the O-alkylation of p-nitrophenol which comprises condensing said p-nitrophenol with norbornadiene in the presence of silica-alumina at a temperature in the range of from about 50° to about 150° C., and recovering the resultant 3-(p-nitrophenoxy)nortricyclene.

References Cited in the file of this patent

UNITED STATES PATENTS

| | | |
|---|---|---|
| 1,469,709 | Wuyts | Oct. 2, 1923 |
| 2,319,386 | Carmody et al. | May 18, 1943 |
| 2,581,917 | Kitchen | Jan. 8, 1952 |
| 2,596,235 | Geiger | May 13, 1952 |
| 2,678,337 | Goode et al. | May 11, 1954 |
| 2,730,548 | Bluestone et al. | Jan. 10, 1956 |